Feb. 8, 1938.   H. P. HOUSER   2,107,534
FACE METER
Filed Nov. 18, 1936

Inventor
Harry P. Houser,
By G. C. Kennedy,
Attorney

Patented Feb. 8, 1938

2,107,534

UNITED STATES PATENT OFFICE 2,107,534

FACE METER

Harry P. Houser, Waterloo, Iowa

Application November 18, 1936, Serial No. 111,413

6 Claims. (Cl. 33—174)

My invention relates to improvements in face meters, and it is one object of my improvements to supply the dental profession with a device of this class, suitable for relative adjustments of its parts for locating a movably mounted indicator therein in relation and connection with other movable parts and adjustably, to permit of locating it in line medially and initially with either a normal or a sidewise distorted lower jaw of a person where it will indicate the natural division of the teeth between the jaws respectively, and where the other movable adjustable elements of the device are properly seated upon the features, and thus permitting the setting of said elements where their relative adjustments are individual, and permitting memoranda to be made of their relative positions before the making of artificial dentures thereafter.

Other objects of my invention pertain to the means for securing the various movable elements in their adjusted positions after the several measuring operations thereof upon the head of the person sitting, whereby in the completed dentures, their relative shapes and positions may correctly reproduce the like at any time after the metering operation is completed, and from the various relative dimensions taken from the metering device.

These objects I have successfully accomplished in reduction to practice, and therefore it is to be understood that various modifications may be adopted and used in the said device, without departing from the principles of my invention and the scope of protection afforded by the appended claims.

Figure 1:
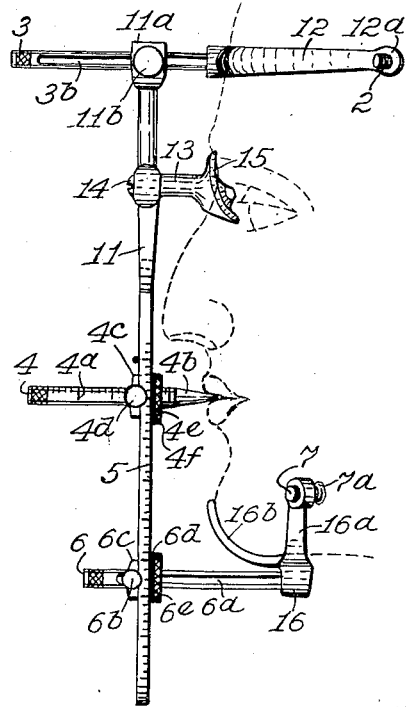
Figure 2:
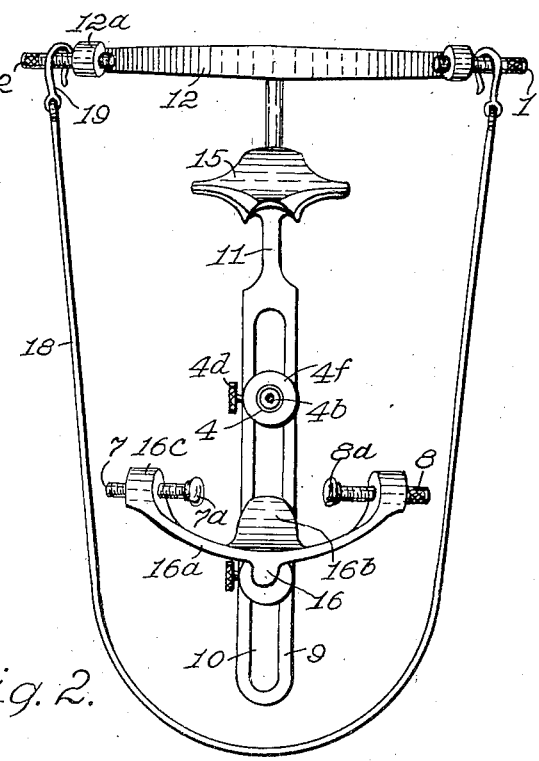
Figure 3:
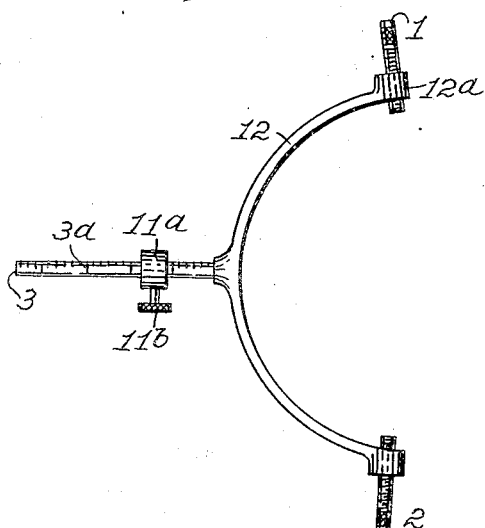
Figure 5:
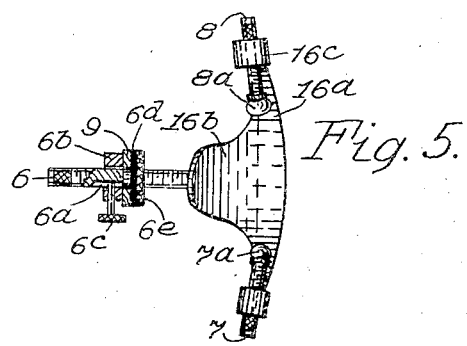
Figure 4:
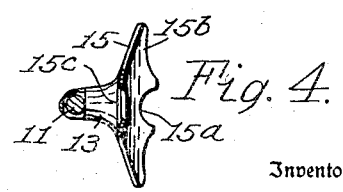

In the annexed drawing, Fig. 1 is a side elevaton of my metering device as properly set and adjusted upon the face of a sitter indicated by dotted lines, and preliminary to making memoranda relating thereto, and Fig. 2 is a rear elevation thereof. Fig. 3 is a top plan of the spanner for the temples; Fig. 4 is a top plan of the nose grasper, and Fig. 5 is a top plan of the chin contacting member of said device.

My invention, when its movable parts have been adjusted to fit different features of a patient, may have these elements secured in their respective positions, and these positions set down upon indicating blanks for future consultation when it becomes necessary to prepare and properly shape and relate dentures individual to the patient. Thus a perfect reproduction of the original teeth and positions of the upper and lower jaws may be effected in the dentures.

Referring initially to said Figs. 1 and 2, the numeral 11 denotes a medial vertically disposed standard for the support of the various movably adjustable elements of the instrument. The top part 11a of this standard is enlarged and with a medial horizontal rod 3 seated in a hole therethrough for forward and rear adjustments therein, and secured in any adjusted position by a set-screw 11b whose contact end bears within a longitudinal lateral groove 3b of the rod. The rear end of the rod 3 has like furcations 12 curved rearwardly, it being understood that these furcations are wider than and adapted to span the brow of the sitter or patient and extending rearwardly relative to the patient's face, and each furcation has a widened termination 12a with an inwardly threaded tubular cross seat for a contacting screw 2 which is adjustable to and from the temple of the patient, thus furnishing a meter for the interspace of the temples.

Spaced below the furcations 12 the standard 11 is widened also and a nose grasper 15 on a short stem 13 is secured thereto by a screw 14 or other means. As shown in Fig. 4 this element 15 has lateral wings 15b with a medial riser 15c, and a medial concavity 15a to be seated upon the upper part of the nose and spanning the concavity between the brow and nose.

The lower portion of the standard 11 is flattened and widened laterally at 9 with a vertical slot 10 extending nearly to its lower end. This slot provides a slideway for like slide-blocks 4c and 6c therein, and these blocks are perforated from front to rear to seat respectively medial horizontal stems 4 and 6 respectively, both having graduations as at 4a therealong. Like set-screws 4d and 6b traverse said blocks 4c and 6c to hold said stems in adjusted positions, and either stem may have longitudinal grooves as at 6a to seat the screws.

Both of the stems are movable along the standard upwardly or downwardly individually and secured in adjusted relative positions. The stem 4, shown in Fig. 1, has a conical rear termination 4b, while the other stem 6, shown in Figs. 1 and 5, has at its rear end a short fixed fork 16a on a head part 16, and a forwardly projecting upwardly curved member or chin rest 16b is made integral with the fork 16a medially. The widened termination 16c of the furcations 16a have threaded seats therethrough seating screws 7 and 8 therein, preferably having rounded inner heads 7a and 8a to bear against opposite parts of the patient's chin or jaw. The stems 4 and 6 have threads upon which are seated like knurled nuts 4e and 6e to compress rubber disks 4f and 6d against the standard part 9, to grip the standard between them and the blocks 4c and 6c respectively. The standard part 9 has along one vertical edge a graduated scale 5.

In fitting the instrument adjustably upon the patient's head, the furcations 12 may have their set-screws 2 contact with the opposite temporal parts of the head. The member 15 then rides against the superorbital ridges. The upwardly concaved chin-rest 16b may be shifted along the standard 9 to fit upon the chin, and its substantially alined end screws 7a and 8a adjusted in the furcations 16a to contact and support a sidewise displaced lower jaw of a patient. The stem 4 may be moved to and from the lips of the patient to be located with its conical point 4b inserted between the lips and between the jaws. Thus all of the movable parts may be adjusted to fit the face of the patient individually, the stem point 4b as adjusted determining the bite in reproducing its location in the dentures. The adjusting screws 1 and 2, and 7 and 8 cooperate in the fitting of the instrument to the face, however normal or distorted in its features, without varying the proper location taken to show the bite. The shut and the ridge lap also are taken care of by such adjustments of the device. The instrument is removably and adjustingly seated upon the patient's face and held by the use of an elastic member 18 having end hooks 19 passed around the screws 1 and 2.

A printed form, such as described or exhibited below for entering data derived from the said adjustments of the instrument, also may include other data relating to the individual case.

```
           Date_____19__
    Name_____
    Address_____
    City _____ State_____
    Telephone_____ Age _____
    Shade of teeth_____
    Form_____
    Width of centrals_____ Upper____
    Width of six anterior_____ Upper____
    Length of centrals_____ Upper____
    Bite_____ Shut_____ Ridge lap_____
    1. _____   5. _____
    2. _____   6. _____
    3. _____   7. _____
    4. _____   8. _____
    4—5. _____   6—5. _____
           Remarks.
```

Instructions as to the modes of adjustments of the elements of the instrument may also be supplied in connection with the above forms, substantially as stated in this specification. The sets of numerals shown in the above form also are those used in the drawing and specification to describe or number certain elements of the instrument.

I claim:

1. In a face meter, a supporting body, an indicator mounted for both longitudinal and horizontal adjustments therealong, and devices mounted on upper and lower end parts of the supporting body respectively, adjustable both longitudinally and horizontally therealong in relation to said indicator, said devices having furcations spaced from and for spanning opposite upper or lower deformed parts of the patient's head, and lacking means for securing said indicator and devices in their adjusted positions.

2. In a face meter, a supporting body adapted to be positioned medially longitudinally forward of a patient's head and face, an indicator supported thereon for both longitudinal and horizontal adjustments therealong to indicate the bite location of opposed jaw teeth, means for securing the indicator in any adjusted position on the supporting body, forked bodies mounted on end parts of the supporting body, the uppermost forked body being horizontally adjustable to and from the patient's face, contact members mounted on the furcations of the uppermost forked body for adjustments to and from opposite parts of the patient's head, means for securing said forked body in an adjusted position on the supporting body, the lowermost forked body being both horizontally and longitudinally adjustable on the supporting body, releasably lockable compressible braking means for securing said lower forked body in any adjusted position on the supporting body, upwardly disposed contact members mounted on the furcations of the lower forked body for adjustments to and from opposite parts of the patient's head, and inwardly directed screws adjustably mounted on the contact members of the lower forked body for laterally engaging the lower jaw of the patient when this body is adjusted in a suitable position for supporting the device adjustingly upon a laterally deformed lower jaw on and with relation to the supporting body.

3. In a face meter, a supporting body, an indicator mounted for longitudinal and horizontal adjustments on said body, spanning devices mounted at end parts of the body for longitudinal and horizontal adjustments thereon, an arm on said body having a termination shaped to have opposite wing parts to rest against the superorbital brow ridges of a patient, and an adjustable chin engaging device mounted lockably for sidewise fitting a laterally deformed lower jaw.

4. In a face meter, a supporting body, an indicator mounted for both longitudinal and horizontal adjustments on said body, means for securing said indicator in any adjusted position, means mounted adjustably on end parts of said body for adjustably engaging opposite head parts of a patient, said indicator being related to the supporting body to indicate the bite position of opposed jaw teeth of the patient, one of said head engaging means carrying a chin engaging device consisting of arms having end screws opposable to opposite sides of a lower jaw sidewise deformed, means for releasably securing said adjustable devices to the supporting body, and a superorbital engaging device mounted on the supporting body between the other head engaging device and said indicator, the indicator and both head engaging means, and said supporting body carrying indicating scales therealong.

5. In a face meter, a supporting body, an indicator mounted on said body for both longitudinal and horizontal adjustments thereon relative to the head of a patient and shiftable to indicate the bite position between the opposed jaw teeth thereof, means for releasably securing said indicator in an adjusted position, and different means mounted on said supporting body adjustably and fixedly respectively to contact with a sidewise displaced lower mandible, the lower mandible and with the superorbital ridges of the patient's head to place the indicator in suitable indicating position thereon.

6. In a face meter, in combination, a standard, a rearwardly projecting fork movably mounted for to and fro adjustments thereon, screws adjustably traversing the ends of the fork for engaging the sides of a patient's head, a rearwardly projecting arm fixed on the standard below said fork having a transversely concave oppositely narrowed termination with a medial upper part shaped to seat against the superorbital brow ridges conformably, the lower part of the standard being transversely flattened and longitudinally slotted, a rearwardly coned horizontal rod mounted in and secured in said slot for rearward adjustments and also being vertically adjustable in the slot, an upwardly concaved chin rest having a forwardly projecting stem traversing said slot adjustably secured therein for both horizontal and vertical adjustments, the chin rest having upwardly curved lateral members positioned at the sides of a chin seated therein, the chin rest having an upwardly curved forward member adapted to serve as a forward stop for the chin, inwardly directed alined transverse screws mounted in the ends of said lateral members adjustably, contacting terminally the sides of the lower jaw, and said brow fork stem, standard, horizontal rod, and chin rest being graduated.

HARRY P. HOUSER.